(12) United States Patent
Grayson et al.

(10) Patent No.: US 7,423,986 B2
(45) Date of Patent: Sep. 9, 2008

(54) PROVIDING A MULTICAST SERVICE IN A COMMUNICATION NETWORK

(75) Inventors: Mark Grayson, Chiswick (GB); Jagdish V. Sonti, San Jose, CA (US); David P. Lindert, San Jose, CA (US); Laurent Montini, Saint-Arnoult-en-Yvelines (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 10/810,189

(22) Filed: Mar. 26, 2004

(65) Prior Publication Data
US 2005/0213525 A1  Sep. 29, 2005

(51) Int. Cl.
*H04J 3/26* (2006.01)
(52) U.S. Cl. ............................ 370/312; 370/432
(58) Field of Classification Search .......... 370/328, 370/341, 338
See application file for complete search history.

(56) References Cited

U.S. PATENT DOCUMENTS

| | | | | |
|---|---|---|---|---|
| 5,590,133 | A * | 12/1996 | Billstrom et al. | 370/349 |
| 5,600,635 | A * | 2/1997 | Hamaki et al. | 370/280 |
| 6,608,832 | B2 * | 8/2003 | Forslow | 370/353 |
| 6,636,502 | B1 * | 10/2003 | Lager et al. | 370/352 |
| 6,701,155 | B2 * | 3/2004 | Sarkkinen et al. | 455/515 |
| 6,795,419 | B2 * | 9/2004 | Parantainen et al. | 370/337 |
| 6,996,410 | B2 * | 2/2006 | Bos et al. | 370/338 |
| 7,039,026 | B2 * | 5/2006 | Francoeur et al. | 370/328 |
| 2001/0012279 | A1 * | 8/2001 | Haumont et al. | 370/331 |
| 2002/0065078 | A1 * | 5/2002 | Cohen et al. | 455/427 |
| 2003/0039232 | A1 * | 2/2003 | Casati et al. | 370/337 |
| 2003/0157952 | A1 * | 8/2003 | Sarkkinen et al. | 455/522 |
| 2003/0223422 | A1 * | 12/2003 | Igarashi et al. | 370/390 |
| 2004/0087320 | A1 * | 5/2004 | Kim et al. | 370/335 |
| 2004/0120314 | A1 * | 6/2004 | Chakrabarti et al. | 370/364 |
| 2004/0185837 | A1 * | 9/2004 | Kim et al. | 455/414.3 |
| 2004/0266388 | A1 * | 12/2004 | Maes | 455/403 |
| 2004/0266440 | A1 * | 12/2004 | Fuchs et al. | 455/445 |
| 2005/0053068 | A1 * | 3/2005 | Toth et al. | 370/390 |

FOREIGN PATENT DOCUMENTS

WO  WO03/039024 A2 * 5/2003

OTHER PUBLICATIONS

3rd Generation Partnership Project; Technical Specification Group Services and System Aspects; Multimedia Broadcast/Multicast Service (MBMS); Architecture and functional description; Release 6; 3GPP TR 23.846, Global System for Mobile Communications; 121 pages, Dec. 2002.

(Continued)

*Primary Examiner*—Anh-Vu H Ly
(74) *Attorney, Agent, or Firm*—Baker Botts L.L.P.

(57) ABSTRACT

Providing a multicast service includes maintaining multicast service information at an application server. The multicast service information describes a multicast service having an associated subscriber, and the multicast service is operable to deliver multicast content from a multicast source. A cell supporting a user device associated with the subscriber is determined, and creation of a bearer path for the multicast service is initiated. Delivery of the multicast content to the user device is enabled using the bearer path.

44 Claims, 2 Drawing Sheets

OTHER PUBLICATIONS

3rd Generation Partnership Project; Technical Specification Group Services and System Aspects; Multimedia Broadcast/Multicast Service; Stage 1; Release 6; 3GPP TS 22.146; 18 pages, Mar. 2003.

3rd Generation Partnership Project; Technical Specification Group Radio Access Network; Feasibility Study on the Evolution of Utran Architecture; Release 6; DRAFT3GPP TR 25.897; 35 pages, Aug. 2003.

3rd Generation Partnership Project; Technical Specification Group Services and System Aspects; Multimedia Broadcast/Multicast Service (MBMS); Architecture and functional description; Release 6; 3GPP TS 23.246; 39 pages, Sep. 2003.

3rd Generation Partnership Project; Technical Specification Group Radio Access Network; Multimedia Broadcast/Multicast Service (MBMS); Utran/Geran Requirements; 3GPP TS 25.992; 11 pages, Sep. 2003.

3rd Generation Partnership Project; Technical Specification Group Radio Access Network; Introduction of the Multimedia Broadcast Multicast Service (MBMS) in the Radio Access Network (Stage-2); Release 6; 3GPP TS 25.346, Global System for Mobile Communications; 40 pages, Nov. 2003.

* cited by examiner

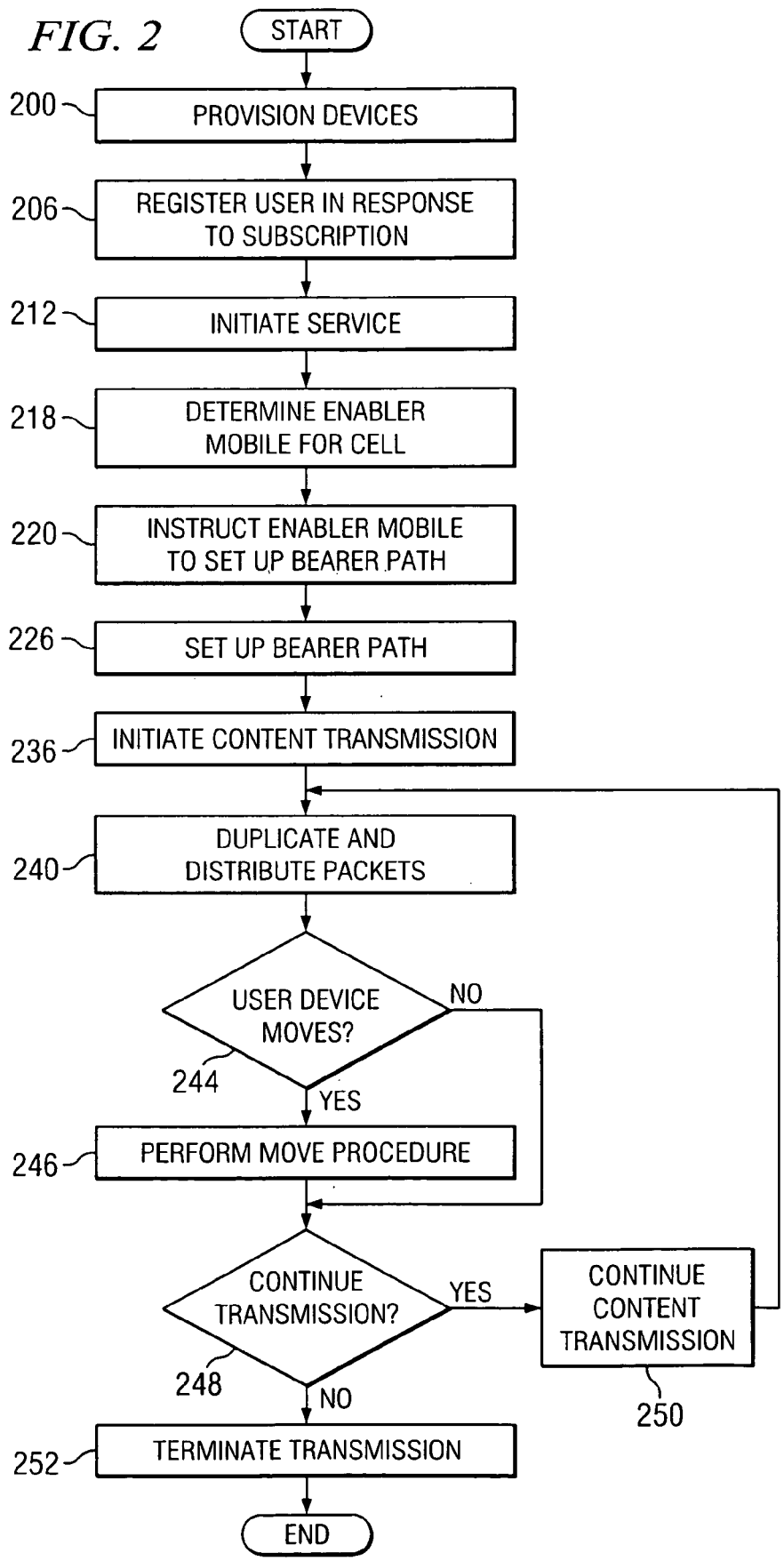

US 7,423,986 B2

PROVIDING A MULTICAST SERVICE IN A COMMUNICATION NETWORK

TECHNICAL FIELD

This invention relates generally to the field of communications and more specifically to providing a multicast service in a communication network.

BACKGROUND

A multicast service broadcasts content to user devices of subscribers of the multicast service. Any type of information may be multicast, for example, soccer match clips, news, or stock quotes. Architecture for delivering multicast services has been proposed by the 3rd Generation Partnership Project (3GPP), a collaboration between standards bodies for the Global System for Mobile communications/General Packet Radio Service (GSM/GPRS) and Universal Mobile Telecommunications System (UMTS) wireless technologies. The proposed architecture, however, is complex and may not be easily implemented. It is generally desirable to have an architecture that may be easily implemented.

SUMMARY OF THE DISCLOSURE

In accordance with the present invention, disadvantages and problems associated with previous techniques for providing a multicast service may be reduced or eliminated.

According to one embodiment, providing a multicast service includes maintaining multicast service information at an application server. The multicast service information describes a multicast service having at least one associated subscriber, and the multicast service is operable to deliver multicast content from a multicast source. A cell supporting a user device associated with the subscriber is determined, and creation of a bearer path for the multicast service is initiated. Delivery of the multicast content to the user device is enabled using the bearer path.

Certain embodiments of the invention may provide one or more technical advantages. A technical advantage of one embodiment may be that multicast services may be provided with relatively few changes to existing network elements. An application server may be introduced to map the services to subscribers, and an enabler mobile may be used to enable multicast services in a specific cell.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which:

FIG. 2 is a flowchart demonstrating one embodiment of a method that may be used in accordance with the present invention.

DETAILED DESCRIPTION OF THE DRAWINGS

Figure 1:
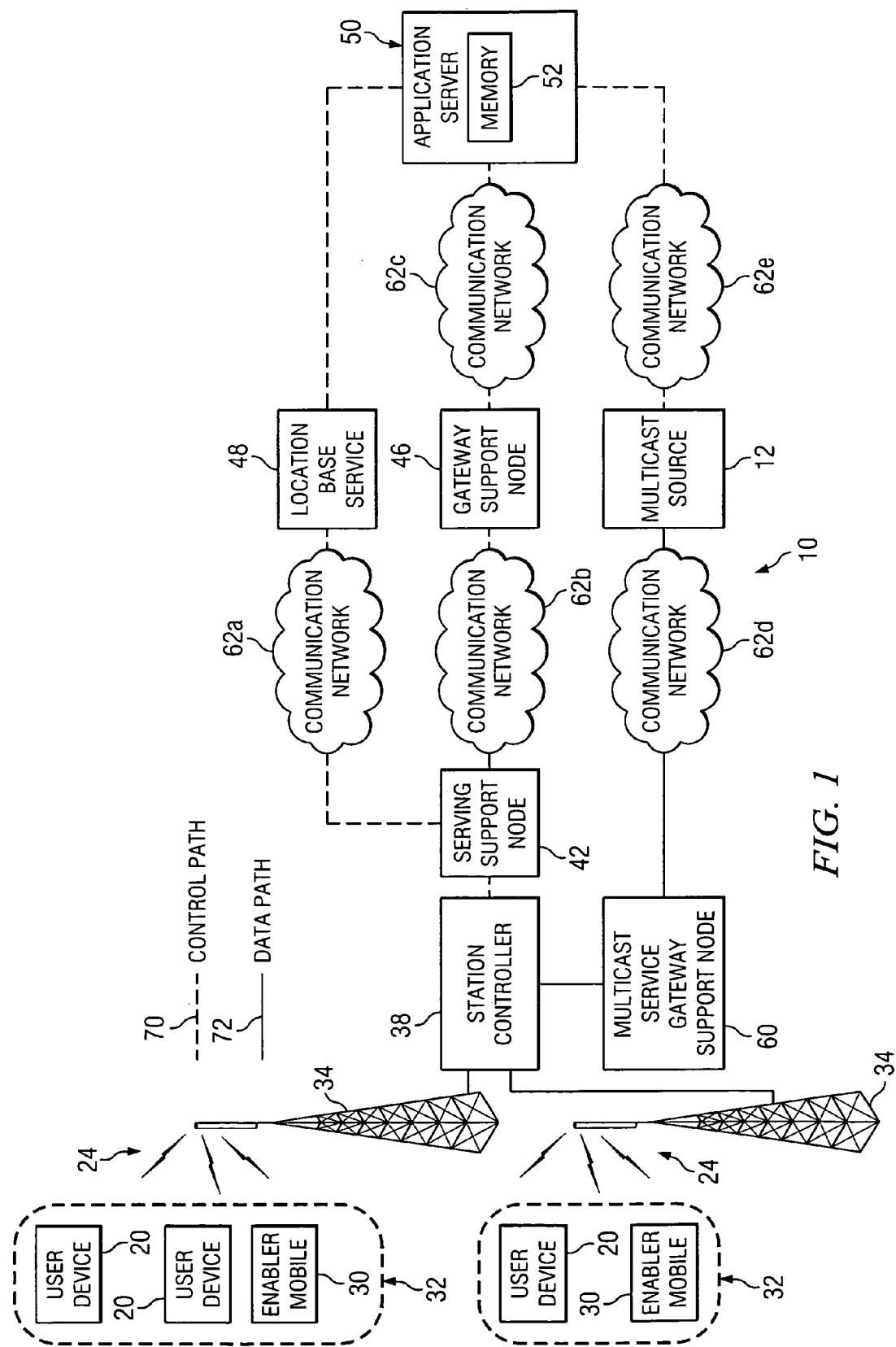
FIG. 1 is a block diagram of one embodiment of a system that may be used in accordance with the present invention.

Embodiments of the present invention and its advantages are best understood by referring to FIGS. 1 and 2 of the drawings, like numerals being used for like and corresponding parts of the various drawings.

FIG. 1 is a block diagram illustrating one embodiment of a system 10 for providing a multicast service. According to one embodiment of operation, system 10 multicasts content from a multicast source 12 to user devices 20 in a cell 32 of a cellular network. An application server 50 may maintain information used to provide the multicast service. Application server 50 may also determine the cell location of user devices 20 and then initiate multicast service. An enabler mobile 30 may operate as a valet for application server 50 to enable multicast service delivery to a user device 20. Enabler mobile 30 may be fixed in position, for example, co-located with a base transceiver system 34. A multicast service gateway support node 60 may operate as an interface for content to a radio network.

A multicast service may refer to the delivery of content to one or more user devices 20 subscribing to the multicast service. According to one embodiment, a multicast service may have different multicast service levels. A multicast service level may be used, for example, to describe parameters for delivering a multicast service to a particular cell 32. A multicast service level may be associated with specific radio access bearer (RAB) parameters such as quality of service parameters. As an example, a multicast service level may be defined as a codec level. Example codec levels may include video at 16, 32, or 64 Kbps, data at 8 Kbps, audio at 16 Kbps, or data and audio at 32 Kbps.

According to one embodiment, the content may be distributed according to Internet Protocol (IP) multicast protocols. A multicast service may have a unique IP multicast address. If a multicast service has multicast service levels, each multicast service level may have a unique IP multicast address.

According to the illustrated embodiment, multicast source 12 provides content delivered through a multicast service. The content may comprise, for example, voice, data, video, audio, multimedia, other information, or any combination of the preceding. Multicast source 12 may be provisioned with the multicast services and multicast service levels.

A user device 20 may comprise any device suitable for communicating data packets to and from system 10. A data packet may comprise a bundle of data organized in a specific way for transmission, and may carry any suitable information such as voice, data, video, audio, multimedia, other information, or any combination of the preceding. Examples of user device 20 include a personal digital assistant, a cellular telephone, a mobile handset, or any other device operable to communicate with system 10.

User device 20 may support any suitable communication protocol, for example, an Internet Protocol such as mobile IP, and may be compatible with any suitable version of Internet Group Management Protocol (IGMP) or Universal Resource Location (URL) Rendezvous Directory (URD). User device 20 may utilize, for example, General Packet Radio Service (GPRS) technology or any other suitable mobile communication technology. User device 20 may be operable to receive content using the IP address of multicast source 12.

User device 20 may have a user identifier that identifies the user device. The user identifier may comprise, for example, a Mobile Station Integrated Services Digital Network (MSISDN) identifier, an International Mobile Subscriber Identity (IMSI), an International Mobile Equipment Identity (IMEI), other suitable identifier, or any combination of the preceding.

User device 20 supports a radio access bearer 24 to receive content from a multicast service. According to one embodiment, user device 20 may support multiple radio access bearers 24. Multiple radio access bearers 24 may enable user device 20 to listen to a multicast service while maintaining a Packet Data Protocol (PDP) context. User device 20 may have an appropriate reader or decoder for reading or decoding the multicast content.

User device 20 may have an application programming interface (API) operable to perform various operations such as listening to radio access bearer 24, subscribing to a multicast service, or other suitable operation. As an example, the application programming interface may be used to contact a portal or web page, which may be provided by, for example, application server 50. User device 20 may be used to open a PDP context to join the server providing the subscription service through, for example, a service portal access point name (APN). User device 20 may communicate with the server using any suitable protocol such as, for example, HyperText Transport Protocol (HTTP) or extensible Markup Language (XML).

System 10 provides multicast services to user devices 20 of subscribers located in cells 32 covered by system 10, and may use any suitable IP multicast technique such as the Internet Group Management Protocol, Protocol Independent Multicast-Sparse Mode (PIM-SM) technique, Bi-Directional (PIM-BiDir), or Source-Specific Multicast (SSM) protocol. According to the illustrated embodiment, system 10 includes an enabler mobile 30, one or more base transceiver stations 34, a station controller 38, a serving support node 42, a gateway support node 46, a location base service 48, an application server 50, a multicast service gateway support node 60, one or more communication networks 62, and a multicast source 12 coupled as shown. System 10 communicates with a user device 20 using a radio access bearer 24 as shown.

System 10 includes a control path 70 and a data path 72 through which data packets are routed. Packets carrying control information travel along control path 70. According to the illustrated embodiment, control path 70 couples station controller 38, serving support node 42, gateway support node 46, location base service 48, one or more communication networks 62, and application server 50 as shown. Packets carrying content travel along data path 72. According to the illustrated embodiment, data path 72 couples station controller 38, multicast service gateway support node 60, communication network 62*d*, and multicast source 12 as shown. The devices of system 10 may communicate using any suitable radio bearer and signaling protocol.

Enabler mobile 30 refers to a device that operates as a valet for application server 50 to enable delivery of a multicast service for user devices 20 of a cell 32. Enabler mobile 30 may include an interface operable to receive information, one or more processors coupled to the interface and that manage the operation of enabler mobile 30, and a memory coupled to the processors and that stores information used by enabler 30. As used in this document, the term "interface" refers to any suitable structure of a device operable to receive input for the device, send output from the device, or both, and may comprise one or more ports. As used in this document, the term "processor" refers to any suitable device operable to accept input and process the input according to predefined rules to produce output. As used in this document, the term "memory" refers to any structure operable to store data, and may comprise Random Access Memory (RAM), Read Only Memory (ROM), magnetic drives, disk drives, Compact Disk (CD) Drives, Digital Video Disk (DVD) drives, removable media storage, any other suitable data storage device, or a combination of any of the preceding.

Enabler mobile 30 may be located in the cell 32 for which it enables the multicast service. More enabler mobiles 30 may be used to increase services. Enabler mobile 30 establishes one or more RAB/PDP contexts for one or more multicast services and sets up and maintains radio access bearer 24 in response to instructions from application server 50. Enabler mobile 30 may have an always-on PDP context with application server 50, and may communicate with application server 50 through multicast service gateway support node 60 associated with the cell 32 of enabler mobile 30. A static IP address may be provisioned for enabler mobile 30.

According to one embodiment, enabler mobile 30 may support capabilities such as Internet Group Management Protocol capabilities, Universal Resource Location Rendezvous Directory capabilities, or other suitable capabilities. Capabilities may include, for example, an IGMP join/leave function to trigger an IP multicast tree set up at multicast service gateway support node 60.

According to one embodiment, enabler mobile 30 may drop any received multicast content to reduce impact on enabler mobile 30. According to another embodiment, enabler mobile 30 may receive at least some multicast content, and may provide feedback on the received multicast content to application server 50 or multicast source 12.

According to one embodiment, enabler mobile 30 may perform power control operations to adjust the power of the signals received by user devices 20. For example, the power may be adjusted so that the received signals have at least a minimum signal power. According to the embodiment, enabler mobile 30 may receive power control information such as a power control delta from application server 50. The power control information may be determined in accordance with the locations of user devices 20.

Enabler mobile 30 may adjust its power report in accordance with the power control information to adjust the signals received by user devices 20. For example, if application server 50 determines that a user device 20 is at the periphery of a cell 32, application server 50 may instruct enabler mobile 30 to subtract a delta from its measured power level before reporting the power level to station controller 38. Application server 50 may calculate the delta as a function of the relative distances of enabler mobile 30 and user device 20 from base transceiver system 34. According to normal power control procedures, when station controller 38 receives a lower reported received power level from enabler mobile 30, station controller 38 signals base transceiver system 34 to increase the transmit power of radio access bearer 24 to allow user device 20 to receive a minimum signal power.

Base transceiver stations 34 provides user devices 20 with access to system 10, and station controller 38 manages the operation of base transceiver stations 34. According to one embodiment, a base transceiver station 34 may comprise a 3G Node B, a 2G base transceiver station, or other suitable transceiver station. According to one embodiment, station controller 38 may comprise a 3G radio network controller, a 2G base station controller, or other suitable station controller. Base transceiver station 34 communicates signals to and from user device 20 using radio access bearer 24. According to one embodiment, one or more multicast services or one or more multicast service levels may use the same radio access bearer 24. Each radio access bearer 24 may be bound to a primary PDP context, which may be maintained by multicast service gateway support node 60. Radio access bearer 24 may comprise a peer-to-peer radio access bearer, a peer-to-multicast radio access bearer, a BAMBOO MEDIACAST multicast bearer, a broadcast radio access bearer, or other suitable radio access bearer.

For transmission reliability purposes, if radio access bearer 24 is not able to perform replication, a forwarding equivalency class may be used at the radio layer, the application layer, or both. For example, the GPRS protocol may be used at the radio layer, or the Internet Engineering Task Force (IETF) Reliable Multicast Transport Working Group (RMTWG) protocols such as those described in RFC 3450 may be used at the application layer. According to one embodiment, a forwarding equivalency class may be used for the radio bearer, and a negative acknowledgement (NACK) may be used up to gateway support node 60.

Serving support node 42 performs mobility management functions such as mobile subscriber attachment and detachment for user device 20. Serving support node 42 may detect user device 20 within its service area, obtain profile data for users from a home location register, and record the location of user device 20. Serving support node 42 may comprise, for example, a Serving GPRS Support Node (SGSN).

Location base service 48 tracks information about user devices 20 in a particular territory, and may comprise, for example, a visitors location register. For example, location base service 48 may map a user device 20 to a particular cell 32 or to a particular position within a specific cell 32. Gateway support node 46 operates as an interface to communication network 62c that allows user device 20 to access communication network 62c. Gateway support node 22 may comprise, for example, a gateway GPRS support node (GGSN).

Application server 50 refers to a device that maintains multicast service information and initiates delivery of a multicast service. Application server 50 may include an interface operable to receive information, one or more processors coupled to the interface and that perform the functions of application server 50, and a memory 52 coupled to the processors and that stores information used by application server 50. The elements of the configuration of application server 50 may be static using, for example, an operations support system (OSS), or dynamic using for example, a localization function.

Application server 50 may be statically or dynamically provisioned with information used to provide the multicast service. The information may include the multicast services, which may include multicast service levels, available to the cells 32 and to the subscribers. Application server 50 may map subscribers to the multicast services or multicast service levels to which they are subscribing. Each multicast service or multicast service level may also be mapped to a corresponding access point name (APN). The multicast service information may be enhanced and refreshed to add, delete or otherwise modify content, subscribers, services, other information, or any combination of the preceding.

Application server 50 may record for each cell 32 a cell type corresponding to the multicast service capabilities of a cell 32. A capability may include, for example, a bearer capability or quality of service. According to one embodiment, the cell type may be associated with a multicast service level to associate a cell 32 having the cell type with multicast service level.

Application server 50 may record the relationships among the cells 32, the cell types, and the multicast services or multicast service levels in any suitable manner. For example, the cell identifier of a cell 32 may be mapped to the corresponding cell type, and the cell type may be mapped to a corresponding multicast service or multicast service level. Application server 50 may include a multicast service level database that is sorted according to cell type, or may create a list of cells 32 for each specific multicast service level.

Application server 50 may maintain the location of an enabler mobile 30 using, for example, the cell identifier of the cell 32 associated with the enabler mobile 30. Enabler mobile 30 may be associated with a multicast service gateway support node 60 by, for example, mapping the location of enabler mobile 30 to the multicast service gateway support node 60. An access point name may be mapped to a multicast service gateway support node 60 to direct packets to the multicast service gateway support node 60.

Application server 50 determines the location of user device 20 and then enables multicast service delivery to user device 20. Application server 50 uses the location of user device 20 to determine the enabler mobile 30 servicing user device 20. Application server 50 may use the location of user device 20 to determine the distance between user device 20 and enabler mobile 30. The distance between user device 20 and enabler mobile 30 may be used to calculate the power control delta. Application server 50 instructs enabler mobile 30 to set up a radio access bearer 24 using the power control delta, and notifies user device 20 to listen to radio access bearer 24. Application server 50 retrieves content from multicast source 12 using any suitable protocol such as the extensible Markup Language protocol.

Multicast service gateway support node 60 refers to a device that operates as an interface for content between multicast source 12 and a radio network. Multicast service gateway support node 60 may comprise, for example, a Gateway GPRS Support Node (GGSN). Multicast service gateway support node 60 may include an interface operable to receive information, one or more processors coupled to the interface and that manage the operation of multicast service gateway support node 60, and a memory coupled to the processors and that stores information used by multicast service gateway support node 60.

According to one embodiment, multicast service gateway support node 60 activates and deactivates a PDP context for a multicast service, and may operate as a requester for radio access bearer 24. Multicast service gateway support node 60 joins the IP multicast tree for the multicast group requested by enabler mobile 30, and maps the multicast service level to the access point name for station controller 38. Multicast service gateway support node 60 receives content from multicast source 12, duplicates the content data packets into one or more RAB/PDP contexts, and distributes the duplicated data packets.

Multicast service gateway support node 60 may perform its functions according to any suitable standard such as the GPRS standards, and may be compatible with the protocol used by user device 20 such as any suitable version of the Internet Group Management Protocol or the Universal Resource Location Rendezvous Directory protocol. As an example, multicast service gateway support node 60 may perform GPRS Tunneling Protocol (GTP) encapsulation to avoid station controller 38 change. The unicast IP addresses referring to the right multicast service gateway support nodes 60 may be provisioned at a Domain Naming System (DNS) server. According to one embodiment, the architecture of multicast service gateway support node 60 may be distributed, for example, most distributed, and multicast service gateway node 60 may be co-located with station controller 38.

Communication networks 62 allow devices to communicate with other devices. Communication networks 62 may comprise at least a portion of public switched telephone network (PSTN), a public or private data network, a local area network (LAN), a metropolitan area network (MAN), a wide area network (WAN), a global computer network such as the Internet, a wireline or wireless network, a local, regional, or global communication network, an enterprise intranet, other suitable communication link, or any combination of the preceding.

Alterations or permutations such as modifications, additions, or omissions may be made to system 10 without departing from the scope of the invention. System 10 may have more, fewer, or other modules. For example, system 10 may have fewer communication networks 62. Moreover, the operations of system 10 may be performed by more, fewer, or other modules. For example, the operations of application server 50 and multicast source 12 may be performed by one module. As another example, the operations of multicast service gateway support node 60 may be performed by more than one module. The operations may be performed by station controller 38 or may be moved further into the network, for example, towards base transceiver station 34. Additionally, operations of system 10 may be performed using any suitable logic comprising software, hardware, other logic, or any suitable combination of the preceding. As used in this document, "each" refers to each member of a set or each member of a subset of a set.

FIG. 2 is a flowchart illustrating one embodiment of a method for providing a multicast service. For ease of explanation, the method is described for providing a multicast service to a user device 20. The method, however, may be used to provide one or more multicast services, which may have multicast service levels, to one or more user devices 20.

The method begins at step 200, where devices of system 10 are provisioned. According to one embodiment, enabler mobile 30 may be provisioned with a static IP address. Application server 50 may be provisioned with multicast service information such as the locations of enabler mobiles 30, the multicast services or multicast service levels of the cells 32, the types of the cells 32, the multicast gateway support nodes 60 for enabler mobiles 30, or any combination of the preceding. A Domain Naming System server may be provisioned with the IP addresses of multicast service gateway support nodes 60.

A user is registered in response to receiving a user subscription from one or more user devices 20 at step 206. According to one embodiment, application server 50 may register the user. A user may subscribe to one or more multicast services or one or more multicast service levels. A user may be registered by mapping the user identifier of the user device 20 to the services or service levels to which the user has subscribed.

The multicast service is initiated at step 212. According to one embodiment, multicast source 12 may initiate the service by announcing to application server 50 that content is ready to be transmitted. According to another embodiment, application server 50 may initiate the service by triggering multicast source 12 to transmit content. An operator may select whether multicast source 12, application server 50, or a combination of multicast source 12 and application server 50 initiate the service.

The enabler mobile 30 associated with the cell 32 of the user device 20 is determined at step 218. Application server 50 may establish the cells 32 of user devices 20 by, for example, accessing location base service 48. Application server 50 may also determine a cell type, a multicast service or multicast service level, other information, or any combination of the preceding corresponding to the cell 32 of enabler mobile 30.

Enabler mobile 30 is instructed to set up a bearer path at step 220. According to one embodiment, application server 50 may first associate enabler mobile 30 with multicast service gateway support node 60. Application server 50 may map the access point name of multicast service gateway support node 60 to the cell identifier corresponding to enabler mobile 30. Application server 50 may then send a notification to instruct enabler mobile 30 to activate radio access bearer 24 and the PDP context for the multicast service. The notification may include the IP address for the multicast group of the multicast service, the IP address of multicast source 12, the access point name of multicast service gateway support node 60, other suitable information, or any combination of the preceding.

A bearer path is set up at step 226. Station controller 38 sets up radio access bearer 24 having an RAB identifier for enabler mobile 30. Enabler mobile 30 opens a PDP context with multicast service gateway support node 60. Enabler mobile 30 sends a query to join the multicast distribution group for the multicast service group or for the multicast service level group using, for example, an Internet Group Management Protocol (IGMP)/Multicast Listener Discovery (MLD) query. The query may include the multicast service address, the multicast source address, multicast service level address, or any combination of the preceding.

Enabler mobile 30 communicates RAB parameters to application server 50, and application server 50 communicates the RAB parameters to user devices 20 to allow them to prepare to listen to radio access bearer 24. The information may be sent using a paging process for any current open PDP context, using a push proxy functionality to trigger the opening of a PDP context, or may be sent in any other suitable manner. If a user device 20 is subscribing during transmission, application server 50 may perform localization and then provide the RAB information to the user device 20. Multicast service gateway support node 60 may receive a join message or a URD request for a multicast group and joins a multicast tree using, for example, a Protocol Independent Multicast (PIM) join. Multicast service gateway support node 60 may then create a (*, G) or (S, G) entry for the multicast tree and create a multicast output interface list with the PDP contexts of one or more enabler mobiles 30.

Content transmission is initiated at step 236. According to one embodiment, application server 50 may notify multicast source 12 that a bearer path has been set up. According to another embodiment, multicast source 12 may send content after a predetermined time period. Multicast source 12 sends content comprising data packets to multicast service gateway support node 60 using, for example, IP multicast forwarding.

The data packets are duplicated and distributed at step 240. According to one embodiment, multicast service gateway support node 60 may duplicate data packets for each RAB identifier. According to another embodiment, multicast service gateway support node 60 may duplicate data packets for each multicast service level. Multicast service gateway support node 60 sends the packets to station controller 38. Station controller 38 transmits the packets to the radio access bearer 24 that corresponds to the RAB identifier. According to one embodiment, radio access bearer 24 transmits the data packets to user devices 20. According to another the embodiment, radio access bearer 24 transmits the data packets to mobile enabler 30, and user devices 20 listen to radio access bearer 24. The method may not require any additional functionality of station controller 38.

Appropriate security measures may be taken in order to reduce the risk of unauthorized reception of the multicast service. According to one embodiment, multicast server 12, user device 20, multicast service gateway node 60, or any combination of the preceding may use one or more Reliable Transport Multicast protocols (from IETF's RTM workgroup) to reliably deliver the multicast service or multicast service level content. For example, user device 20 may use IETF RMT's Asynchronous Layered Coding (ALC), or user device 20 or multicast service gateway node 60 may use IETF RMT's NACK-Oriented Reliable Multicast Protocol (NORM), Pragmatic Generic Multicast (PGM), other mechanism implemented at the application or transport level, or any combination of the preceding to participate in reliable multicast transmission.

If user device 20 moves from one cell 32 to another cell 32 that may be managed by the same or another base transceiver station 34 at step 244, the method proceeds to step 246, where a move procedure is performed. According to one embodiment, a multicast service routing update may be used to maintain the location of user device 20. User device 20 sends a routing update, and application server 50 is notified of the move. Application server 50 may be notified of a change in location by any suitable technique such as by periodic retransmission or by using Reliable Multicast Transport Asynchronous Layered Coding (RMT ALC) protocols. According to one embodiment, all multicast service levels may be multicast to a cell 32 such that a user device may access its service level. The method then proceeds to step 248. If user device 20 does not move at step 244, the method proceeds directly to step 248.

If transmission is to continue at step 248, the method proceeds to step 250, where multicast source 12 continues to transmit data packets to multicast service gateway support node 60. The method then returns to step 240, where the packets are duplicated and distributed. If transmission is not to continue at step 248, the method proceeds to step 252.

Transmission is terminated at step 252. Multicast source 12, application server 50, user device 20, or other suitable device may initiate termination. Application server 50 may notify user device 20 that transmission is being terminated. Application server 50 may request that enabler mobile 30 leave the multicast group to free the resource, or enabler mobile 30 may be allowed to maintain the resource. According to one embodiment, application server 50 notifies enabler mobile 30 to terminate the PDP and RAB sessions. Enabler mobile 30 may send a message such as an Internet Group Management Protocol/Multicast Listener Discovery message to leave the multicast group. Multicast service gateway node 60 may then update the multicast output interface list by deleting the required PDP Context from the list, and may leave the multicast distribution tree by, for example, sending a pruning message. Enabler mobile 30 requests a PDP deactivation, and station controller 38 deactivates radio access bearer 24.

User device 20 may initiate termination. According to one embodiment, user device 20 may stop listening to radio access bearer 24. According to another embodiment, user device 20 may contact application server 50 to stop transmission or to unsubscribe to the service. According to another embodiment, loss of contact with user device 20 may initiate termination of the multicast service. Enabler mobile 30 of a cell 32 may be requested to initiate termination if no user device 20 is in the cell 32. Application server 50 may record that the communication was not completed due to, for example, a loss of signal or other suitable reason, and may retransmit the content. After terminating transmission, the method terminates.

Alterations or permutations such as modifications, additions, or omissions may be made to the method without departing from the scope of the invention. The method may include more, fewer, or other steps. Additionally, steps may be performed in any suitable order without departing from the scope of the invention. According to one embodiment, a multicast service may be provided from user device 20 to user device 20 if user devices 20 support IP multicast.

Certain embodiments of the invention may provide one or more technical advantages. A technical advantage of one embodiment may be that multicast services may be provided with relatively few changes to existing network elements, particularly in the radio access network. An application server may be introduced to map the services to subscribers, and an enabler mobile may be used to enable multicast services in a specific cell 32.

While this disclosure has been described in terms of certain embodiments and generally associated methods, alterations and permutations of the embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

To aid the Patent Office and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are used in the particular claim.

What is claimed is:

1. A method to provide a multicast service, comprising:
   maintaining multicast service information at an application server, the multicast service information describing a multicast service having an associated subscriber, the multicast service operates to deliver multicast content from a multicast source;
   determining a cell supporting a user device associated with the subscriber;
   initiating creation of a bearer path for the multicast service by instructing, from the application server, an enabler mobile to establish one or more radio access bearer (RAB)/Packet Data Protocol (PDP) contexts for one or more multicast services and to set up and maintain the bearer path; and
   directing the enabler mobile to facilitate delivery of the multicast content to the user device using the bearer path, the enabler mobile located in the cell for which the enabler mobile enables delivery, the enabler mobile substantially fixed in position and distinct from a base station operable to communicate the multicast content to the user device; the enabler mobile further distinct from a base station controller.

2. The method of claim 1, wherein initiating creation of the bearer path for the multicast service further comprises:
   determining an enabler mobile corresponding to the cell supporting the user device; and
   instructing the enabler mobile to initiate creation of a radio access bearer.

3. The method of claim 1, further comprising communicating one or more parameters associated with the bearer path to the user device, the user device operates to use the parameters to receive the multicast content.

4. The method of claim 1, further comprising establishing a multicast service level of the multicast service in accordance with the cell supporting the user device.

5. The method of claim 1, further comprising performing a power control operation by:

determining a signal power;
calculating power control information from the signal power; and
initiating adjustment of the signal power according to the power control information.

6. A server to provide a multicast service, comprising:
a memory operates to store multicast service information, the multicast service information describing a multicast service having an associated subscriber, the multicast service operates to deliver multicast content from a multicast source; and
one or more processors coupled to the memory and operate to:
   determine a cell supporting a user device associated with the subscriber;
   initiate creation of a bearer path for the multicast service by instructing, from an application server, an enabler mobile to establish one or more radio access bearer (RAB)/Packet Data Protocol (PDP) contexts for one or more multicast services and to set up and maintain the bearer path; and
   directing the enabler mobile to facilitate delivery of the multicast content to the user device using the bearer path, the enabler mobile located in the cell for which the enabler mobile enables delivery, the enabler mobile substantially fixed in position and distinct from a base station operable to communicate the multicast content to the user device; the enabler mobile further distinct from a base station controller.

7. The server of claim 6, wherein the one or more processors operate to initiate creation of the bearer path for the multicast service by:
   determining an enabler mobile corresponding to the cell supporting the user device; and
   instructing the enabler mobile to initiate creation of a radio access bearer.

8. The server of claim 6, wherein the one or more processors further operate to communicate one or more parameters associated with the bearer path to the user device, the user device operable to use the parameters to receive the multicast content.

9. The server of claim 6, wherein the one or more processors further operate to establish a multicast service level of the multicast service in accordance with the cell supporting the user device.

10. The server of claim 6, wherein the one or more processors further operate to perform a power control operation by:
   determining a signal power;
   calculating power control information from the signal power; and
   initiating adjustment of the signal power according to the power control information.

11. A computer readable medium encoded with computer executable logic to provide a multicast service, the logic operable to:
   maintain multicast service information at an application server, the multicast service information describing a multicast service having an associated subscriber, the multicast service operable to deliver multicast content from a multicast source;
   determine a cell supporting a user device associated with the subscriber;
   initiate creation of a bearer path for the multicast service by instructing, from the application server, an enabler mobile to establish one or more radio access bearer (RAB)/Packet Data Protocol (PDP) contexts for one or more multicast services and to set up and maintain the bearer path; and
   directing the enabler mobile to facilitate delivery of the multicast content to the user device using the bearer path, the enabler mobile located in the cell for which the enabler mobile enables delivery, the enabler mobile substantially fixed in position and distinct from a base station operable to communicate the multicast content to the user device; the enabler mobile further distinct from a base station controller.

12. The computer readable medium of claim 11, the logic further operable to initiate creation of the bearer path for the multicast service by:
   determining an enabler mobile corresponding to the cell supporting the user device; and
   instructing the enabler mobile to initiate creation of a radio access bearer.

13. The computer readable medium of claim 11, the logic further operable to communicate one or more parameters associated with the bearer path to the user device, the user device operates to use the parameters to receive the multicast content.

14. The computer readable medium of claim 11, the logic further operable to establish a multicast service level of the multicast service in accordance with the cell supporting the user device.

15. The computer readable medium of claim 11, the logic further operable to perform a power control operation by:
   determining a signal power;
   calculating power control information from the signal power; and
   initiating adjustment of the signal power according to the power control information.

16. A method to provide a multicast service, comprising:
   receiving at an enabler device an instruction, from an application server, to create a radio access bearer for a multicast service, the multicast service operates to deliver multicast content from a multicast source, the enabler device assigned to a cell supporting a user device;
   creating and maintaining the radio access bearer for the multicast service in response to the instruction;
   opening one or more radio access bearer (RAB)/Packet Data Protocol (PDP) contexts for one or more multicast services for the radio access bearer in response to the instruction; and
   directing the enabler device to facilitate delivery of the multicast content to the user device using the radio access bearer, the enabler device located in the cell for which the enabler device enables delivery, the enabler device substantially fixed in position and distinct from a base station operable to communicate the multicast content to the user device; the enabler device further distinct from a base station controller.

17. The method of claim 16, further comprising communicating one or more parameters associated with the radio access bearer to an application server.

18. A enabler device to provide a multicast service, comprising:
   an interface operates to receive an instruction, from an application server, to create a radio access bearer for a multicast service, the multicast service operates to deliver multicast content from a multicast source, the enabler device located in a cell supporting a user device, the enabler device located in the cell for which the enabler device enables delivery of multicast content, the enabler device substantially fixed in position and distinct from a base station operable to communicate the multicast content to the user device, the enabler device further distinct from a base station controller; and one or more processors coupled to the interface and operate to:

create and maintain the radio access bearer for the multicast service in response to the instruction;

open one or more radio access bearer (RAB)/Packet Data Protocol (PDP) contexts for one or more multicast services for the radio access bearer in response to the instruction; and enable delivery of the multicast content to the user device using the radio access bearer.

19. The enabler device of claim 18, wherein the one or more processors further operate to communicate one or more parameters associated with the radio access bearer to an application server.

20. A computer readable medium encoded with computer executable logic to provide a multicast service, the logic operable to:

receive at an enabler device an instruction, from an application server, to create a radio access bearer for a multicast service, the multicast service operates to deliver multicast content from a multicast source, the enabler device assigned to a cell supporting a user device;

create and maintain the radio access bearer for the multicast service in response to the instruction;

opening one or more radio access bearer (RAB )/Packet Data Protocol (PDP) contexts for one or more multicast services for the radio access bearer in response to the instruction; and direct the enabler device to facilitate delivery of the multicast content to the user device using the radio access bearer, the enabler device located in the cell for which the enabler device enables delivery, the enabler device substantially fixed in position and distinct from a base station operable to communicate the multicast content to the user device; the enabler device further distinct from a base station controller.

21. The computer readable medium of claim 20, the logic further operable to communicate one or more parameters associated with the radio access bearer to an application server.

22. A method to provide a multicast service, comprising:

activating at a multicast gateway support node a Packet Data Protocol context for a multicast service, the multicast service facilitated by a plurality of enabler mobiles located in one or more cells, the enabler mobiles operate to establish the Packet Data Protocol context for the multicast services and to set up and maintain a bearer path in response to an instruction from an application server, the plurality of enabler mobiles operate to deliver multicast content from a multicast source, each enabler mobile of the plurality of enabler mobiles substantially fixed in position and distinct from a base station operable to communicate the multicast content from the multicast source, each enabler mobile of the plurality of enabler mobiles farther distinct from a base station controller, each enabler mobile located in the cell for which the enabler mobile enables delivery of multicast content;

receiving an instruction to join a multicast tree for the multicast service; and joining the multicast tree in response to the instruction.

23. The method of claim 22, further comprising:

receiving the multicast content communicated using a plurality of data packets; and duplicating the data packets to create duplicated data packets for each enabler mobile of the plurality of enabler mobiles.

24. A node to provide a multicast service, comprising:

an interface operates to:

receive an instruction to activate a Packet Data Protocol context for a multicast service, the multicast service facilitated by a plurality of enabler mobiles located in one or more cells, the enabler mobiles operate to establish the Packet Data Protocol context for the multicast services and to set up and maintain a bearer path in response to an instruction from an application server, the plurality of enabler mobiles operates to deliver multicast content from a multicast source, each enabler mobile of the plurality of enabler mobiles substantially fixed in position and distinct from a base station operable to communicate the multicast content from the multicast source, each enabler mobile of the plurality of enabler mobiles further distinct from a base station controller, each enabler mobile located in a cell for which the enabler mobile enables delivery of multicast content;

receive an instruction to join a multicast tree for the multicast service; and one or more processors coupled to the interface and operate to:

activate the Packet Data Protocol in response to the instruction to activate the Packet Data Protocol context; and join the multicast tree in response to the instruction to join the multicast tree.

25. The node of claim 24, wherein:

the interface operates to receive the multicast content communicated using a plurality of data packets; and the one or more processors operate to duplicate the data packets to create duplicated data packets for each enabler mobile of the plurality of enabler mobiles.

26. A computer readable medium encoded with computer executable logic to provide a multicast service, the logic operable to:

activate at a multicast gateway support node a Packet Data Protocol context for a multicast service, the multicast service facilitated by a plurality of enabler mobiles located in one or more cells, the enabler mobiles operate to establish the Packet Data Protocol context for the multicast services and to set up and maintain a bearer path in response to an instruction from an application server, the plurality of enabler mobiles operate to deliver multicast content from a multicast source, each enabler mobile of the plurality of enabler mobiles substantially fixed in position and distinct from a base station operable to communicate the multicast content from the multicast source, each enabler mobile of the plurality of enabler mobiles further distinct from a base station controller, each enabler mobile located in a cell for which the enabler mobile enables delivery of multicast content;

receive an instruction to join a multicast tree for the multicast service; and join the multicast tree in response to the instruction.

27. The computer readable medium of claim 26, the logic further operable to:

receive the multicast content communicated using a plurality of data packets; and duplicate the data packets to create duplicated data packets for each enabler mobile of the plurality of enabler mobiles.

28. A method to provide a multicast service, comprising:
maintaining multicast service information at an application server, the multicast service information describing a multicast service having an associated subscriber, the multicast service operates to deliver multicast content from a multicast source;
initiating creation of a bearer path for the multicast service by communicating an instruction from the application server to at least one enable mobile of a plurality of enabler mobiles, the instruction to establish one or more radio access bearer (RAB)/Packet Data Protocol (PDP) contexts for one or more multicast services and to create and maintain a radio access bearer for the multicast service, the at least one enabler mobile of the plurality of enabler mobiles associated with a cell supporting a user device associated with the subscriber; and
directing the at least one enabler mobile of the plurality of enabler mobiles to facilitate delivery of the multicast content to the user device using the bearer path, the plurality of enabler mobiles located in one or more cells, each enabler mobile of the plurality of enabler mobiles substantially fixed in position and distinct from a base station operable to communicate the multicast content to the user device, each enabler mobile of the plurality of enabler mobiles further distinct from a base station controller.

29. The method of claim 28, wherein directing the at least one enabler mobile of the plurality of enabler mobiles to facilitate delivery of the multicast content to the user device using the bearer path, the plurality of enabler mobiles located in one or more cells further comprises:
activating at a multicast gateway support node a Packet Data Protocol context for the multicast service; and
joining the multicast gateway support node to a multicast tree for the multicast service.

30. The method of claim 28, further comprising communicating one or more parameters associated with the bearer path to the user device, the user device operates to use the parameters to receive the multicast content.

31. The method of claim 28, further comprising establishing a multicast service level of the multicast service in accordance with, at least one of the cells supporting the user device and a subscription of the subscriber.

32. The method of claim 28, further comprising:
receiving at a multicast gateway support node the multicast content communicated using a plurality of data packets; and
duplicating the data packets to create duplicated data packets for each enabler mobile of the plurality of enabler mobiles.

33. A system to provide a multicast service, comprising:
an application server operates to:
maintain multicast service information describing a multicast service having an associated subscriber, the multicast service operates to deliver multicast content from a multicast source; and
initiate creation of a bearer path for the multicast service by communicating an instruction to create a radio access bearer for the multicast service; and
an enabler device associated with a cell supporting a user device associated with the subscriber, the enabler device substantially fixed in position and distinct from a base station operable to communicate the multicast content to the user device, the enabler device further distinct from a base station controller, the enable device located in the cell and operates to:
receive an instruction, from the application server, to create the radio access bearer for the multicast service;
create and maintain the radio access bearer in response to the instruction;
establish one or more radio access bearer (RAB)/Packet Data Protocol (PDP) contexts for one or more multicast services in response to the instruction; and
enable delivery of the multicast content to the user device using the bearer path, the enabler device located in the cell for which the enabler device enables delivery.

34. The system of claim 33, further comprising a multicast gateway support node operates to:
activate a Packet Data Protocol context for the multicast service; and
join the multicast gateway support node to a multicast tree for the multicast service.

35. The system of claim 33, the application server further operates to communicate one or more parameters associated with the bearer path to the user device, the user device operates to use the parameters to receive the multicast content.

36. The system of claim 33, the application server further operates to establish a multicast service level of the multicast service in accordance with at least one of the cell supporting the user device and a subscription of the subscriber.

37. The system of claim 33, further comprising a multicast gateway support node operates to:
receive the multicast content communicated using a plurality of data packets; and
duplicate the data packets to create duplicated data packets for each enabler mobile of a plurality of enabler mobiles.

38. A computer readable medium encoded with computer executable logic to provide a multicast service, the logic operable to:
maintain multicast service information at an application server, the multicast service information describing a multicast service having an associated subscriber, the multicast service operates to deliver multicast content from a multicast source;
initiate creation of a bearer path for the multicast service by communicating an instruction from the application server to an enabler device, the instruction establishes one or more radio access bearer (RAB)/Packet Data Protocol (PDP) contexts for one or more multicast services and creates and maintains a radio access bearer for the multicast service, the enabler device located in a cell supporting a user device associated with the subscriber, the enabler device substantially fixed in position and distinct from a base station operable to communicate the multicast content to the user device, the enabler device further distinct from a base station controller; and
enable delivery, by the enabler device, of the multicast content to the user device using the bearer path, the enabler device located in the cell for which the enabler device enables delivery.

39. The computer readable medium of claim 38, the logic further operable to enable delivery of the multicast content to the user device using the bearer path by:
activating at a multicast gateway support node a Packet Data Protocol context for the multicast service; and
joining the multicast gateway support node to a multicast tree for the multicast service.

40. The computer readable medium of claim 38, the logic further operable to communicate one or more parameters associated with the bearer path to the user device, the user device operates to use the parameters to receive the multicast content.

41. The computer readable medium of claim 38, the logic further operable to establish a multicast service level of the multicast service in accordance with at least one of the cell supporting the user device and a subscription of the subscriber.

42. The computer readable medium of claim 38, the logic further operable to:
   receive at a multicast gateway support node the multicast content communicated using a plurality of data packets; and
   duplicate the data packets to create duplicated data packets for each enabler mobile of a plurality of enabler mobiles.

43. A system to provide a multicast service, comprising:
   means for maintaining multicast service information at an application server, the multicast service information describing a multicast service having an associated subscriber, the multicast service operates to deliver multicast content from a multicast source;
   means for initiating creation of a bearer path for the multicast service by communicating an instruction from the application server to an enabler device, the instruction establishes one or more radio access bearer (RAB)/Packet Data Protocol (PDP) contexts for one or more multicast services and creates and maintains a radio access bearer for the multicast service, the enabler device located in a cell supporting a user device associated with the subscriber, the enabler device substantially fixed in position and distinct from a base station operable to communicate the multicast content to the user device, the enabler device further distinct from a base station controller; and
   means for enabling delivery of the multicast content to the user device using the bearer path, the means for enabling delivery located in the cell for which the means for enabling delivery enables delivery.

44. A method to provide a multicast service, comprising:
   maintaining multicast service information at an application server, the multicast service information describing a multicast service having an associated subscriber, the multicast service operates to deliver multicast content from a multicast source;
   establishing a multicast service level of the multicast service in accordance with a cell supporting a user device of a plurality of user devices, the user device associated with the subscriber;
   initiating creation of a bearer path for the multicast service by communicating an instruction from the application server to an enabler device of a plurality of enabler devices, the instruction establishes one or more radio access bearer (RAB)/Packet Data Protocol (PDP) contexts for one or more multicast services and creates and maintains a radio access bearer for the multicast service, the enabler device located in the cell supporting the user device associated with the subscriber, the enabler device substantially fixed in position and distinct from a base station operable to communicate the multicast content to the user device, the enabler device further distinct from a base station controller;
   enabling delivery, by the enabler device, of the multicast content to the user device using the bearer path by:
      activating at a multicast gateway support node a Packet Data Protocol context for the multicast service; and
      joining the multicast gateway support node to a multicast tree for the multicast service, the enabler device located in the cell for which the enabler device enables delivery;
   communicating one or more parameters associated with the bearer path to the user device, the user device operates to use the parameters to receive the multicast content;
   receiving at the multicast gateway support node the multicast content communicated using a plurality of data packets; and
   duplicating the data packets to create duplicated data packets for each enabler device of the plurality of enabler devices.

\* \* \* \* \*